US011789842B2

(12) United States Patent
Wang et al.

(10) Patent No.: US 11,789,842 B2
(45) Date of Patent: Oct. 17, 2023

(54) SYSTEM AND METHOD FOR ADVANCED DETECTION OF POTENTIAL SYSTEM IMPAIRMENT

(71) Applicant: Dell Products L.P., Round Rock, TX (US)

(72) Inventors: Dale Wang, Hayward, CA (US); Min Gong, Shanghai (CN); Ashok Narayanan Potti, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 81 days.

(21) Appl. No.: 17/498,156

(22) Filed: Oct. 11, 2021

(65) Prior Publication Data

US 2023/0112346 A1 Apr. 13, 2023

(51) Int. Cl.
  *G06F 11/00* (2006.01)
  *G06F 11/30* (2006.01)
  *G06F 11/07* (2006.01)
  *G06N 5/04* (2023.01)
  *G06F 16/33* (2019.01)
  *G06F 11/22* (2006.01)

(52) U.S. Cl.
  CPC ........ *G06F 11/3072* (2013.01); *G06F 11/079* (2013.01); *G06F 11/0787* (2013.01); *G06F 16/3337* (2019.01); *G06N 5/04* (2013.01); *G06F 11/2263* (2013.01)

(58) Field of Classification Search
  CPC ............. G06F 11/3072; G06F 11/0787; G06F 11/079; G06F 11/2263

USPC ....................................................... 714/1–57
See application file for complete search history.

(56) References Cited

U.S. PATENT DOCUMENTS

| | | | | |
|---|---|---|---|---|
| 2002/0184554 A1* | 12/2002 | McKenzie | .......... | H04L 41/0631 714/4.5 |
| 2004/0003319 A1* | 1/2004 | Ukai | .................. | G06F 11/1482 714/45 |
| 2004/0250163 A1* | 12/2004 | Roddy | ................ | G06F 11/2257 714/25 |
| 2004/0250173 A1* | 12/2004 | Jiang | ....................... | H04L 69/00 714/43 |
| 2005/0278570 A1* | 12/2005 | Jastad | ................... | G06F 11/008 714/25 |
| 2008/0065928 A1* | 3/2008 | Suzuki | ................. | G06F 11/079 715/781 |
| 2009/0094478 A1* | 4/2009 | Harper | ................. | G06F 11/203 718/107 |

(Continued)

*Primary Examiner* — Sarai E Butler
(74) *Attorney, Agent, or Firm* — Womble Bond Dickinson (US) LLP

(57) ABSTRACT

Methods and systems for managing deployments are disclosed. A deployment may include one or more devices. The devices may include hardware and/or software components. The operation of the deployment may depend on the operation of these devices and components. To manage the operation of the deployment, a system may include a deployment manager. The deployment manager may obtain logs for components of the deployment reflecting the historical operation of these components and use the log to predict the future operation of the deployment. Based on the predictions, the deployment manager may take proactive action to reduce the likelihood of the deployment becoming impaired.

20 Claims, 16 Drawing Sheets

(56) References Cited

U.S. PATENT DOCUMENTS

| | | | |
|---|---|---|---|
| 2012/0005536 A1* | 1/2012 | Beattie, Jr. | H04L 41/0677 |
| | | | 714/E11.029 |
| 2013/0246787 A1* | 9/2013 | Everett | H04L 12/6418 |
| | | | 713/164 |
| 2014/0068356 A1* | 3/2014 | Watanabe | G06F 11/0757 |
| | | | 714/57 |
| 2015/0254125 A1* | 9/2015 | Kakui | G06F 11/008 |
| | | | 714/47.3 |
| 2016/0147622 A1* | 5/2016 | Nichols | G06F 16/1734 |
| | | | 714/57 |
| 2016/0154690 A1* | 6/2016 | Horrell | G06F 11/0754 |
| | | | 714/57 |
| 2018/0024889 A1* | 1/2018 | Verma | G06F 11/0766 |
| | | | 714/15 |
| 2020/0125465 A1* | 4/2020 | Choi | G06N 3/047 |
| 2021/0124752 A1* | 4/2021 | Swanson | G06F 16/254 |
| 2022/0164168 A1* | 5/2022 | Ovadia | G06F 9/45558 |

* cited by examiner

| Storage Read Delay Log Events 510 | Storage Write Delay Log Events 512 | Storage Unavailable Log Events 514 |

Training Data Generation 520

Training Data 522

Inference Model Training 524

Trained Inference Model 530

SYSTEM AND METHOD FOR ADVANCED DETECTION OF POTENTIAL SYSTEM IMPAIRMENT

FIELD

Embodiments disclosed herein relate generally to operation management. More particularly, embodiments disclosed herein relate to systems and methods to manage the operation of deployments.

BACKGROUND

Computing devices may provide computer implemented services. The computer implemented services may be used by users of the computing devices and/or devices operably connected to the computing devices. The computer implemented services may be performed with hardware components such as processors, memory modules, storage devices, and communication devices. The operation of these components may impact the performance of the computer implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
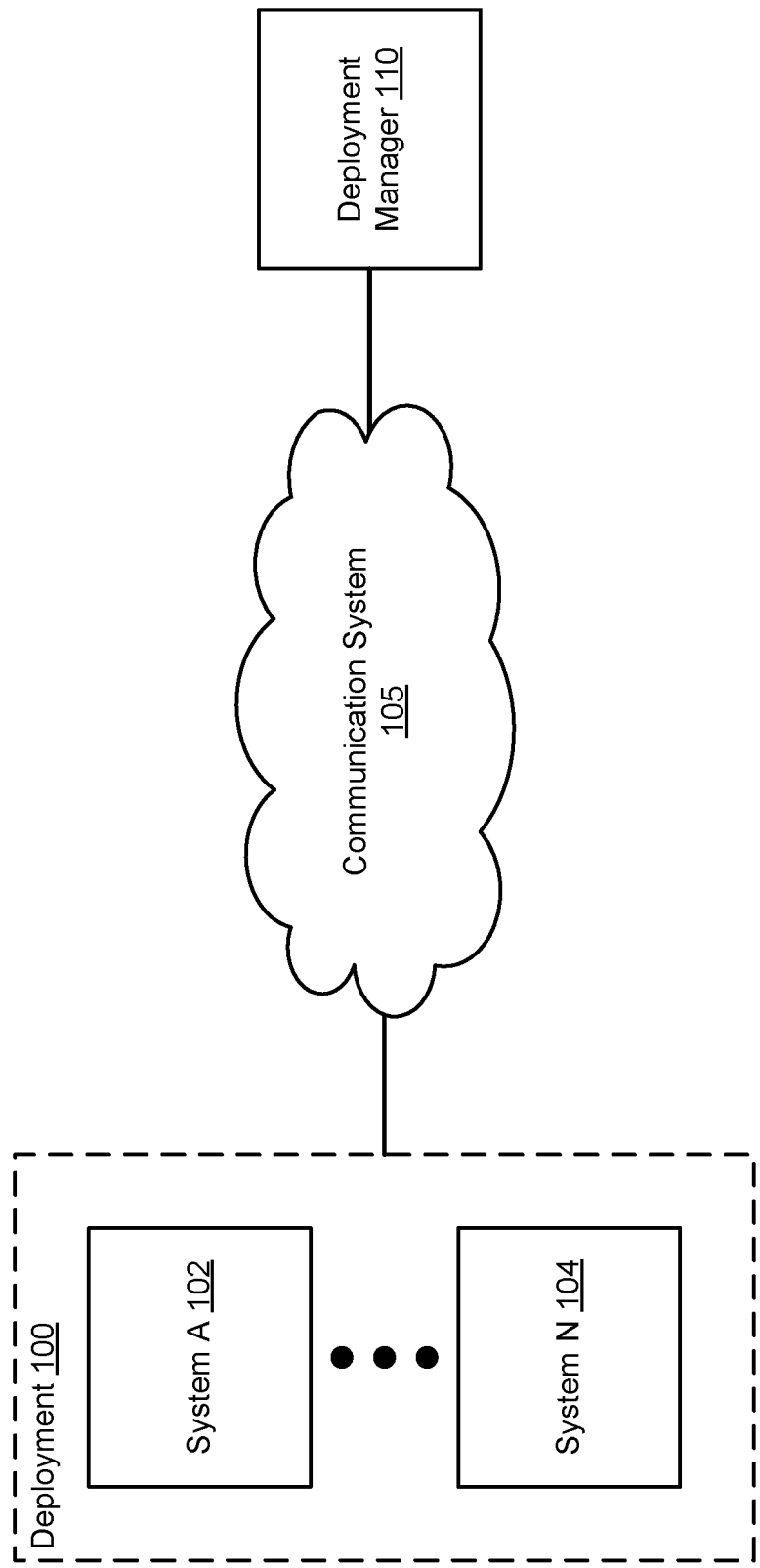
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

In general, embodiments disclosed herein relate to methods and systems for managing deployments. A deployment may include one or more devices. The devices may include hardware and/or software components. The operation of the deployment may depend on the operation of these devices and components. For example, improper operation of any of these devices and/or components may impair (e.g., reduce performance, reduce functionality, etc.) the operation of the deployment.

To manage the operation of the deployment, the system may include a deployment manager. The deployment manager may obtain logs for components of the deployment reflecting the historical operation of these components and use the log to predict the future operation of the deployment. For example, the logs may be used to train inference models that may generate predictions of future impairments of the deployment and the time until such impairments are likely to occur. Based on the predictions, the deployment manager may take proactive action to reduce the likelihood of the impairments from occurring.

To obtain the inference models, log events from the logs may be used to obtain relationships between message identifier patterns and previous impairments. The message identifier patterns may be obtained based on various window sizes and increments (e.g., with respect to the log events) to obtain a number of different relationships with respect to a single impairment event. The inference models trained using these message identifier patterns may be used to obtain multiple predictions having various degrees of confidence in the predictions. By doing so, labeled data may not be needed for obtaining the inference model and corresponding predictions. Consequently, the disclosed system may be broadly applicable to a wide variety of deployments that may generate logs that include various types and quantities of information.

The degrees of confidence in the predictions may be used to determine (i) whether proactive action should be taken and/or (ii) the type of actions to be taken. By doing so, a system in accordance with embodiments disclosed herein may provide a deployment with an improved uptime through proactive management. The proactive action may be taken based on logs that generally indicate past rather than future operation of the deployment. By doing so, impairments that are likely to occur but that are not naturally indicated by the logs may be proactively addressed.

In an embodiment, a computer-implemented method for managing operation of a deployment by proactively identifying when the deployment is likely to enter an impairment state is provided. The method may include obtaining logs for a deployment, the logs reflecting activity of the deployment that may be relevant to the impairment state; obtaining identified messages for the logs, each identified message of the identified messages indicating: an entity of the deployment that generated a log entry of the logs corresponding to the respective identified message, and a condition associated with the log entry of the logs corresponding to the respective identified message; predicting, with an inference model, a future impairment of the deployment based on: the identified messages, and temporal relationships between the identified messages; and performing an action set based, at least in part, on the future impairment to reduce a potential impact of the future impairment on the deployment.

Obtaining the identified messages may include, for a first log entry of the log entries, reading an identified message of the identified messages from the log entry.

Obtaining the identified messages may also include making a determination that a second log entry of the log entries does not include any of the identified messages; and, based on the determination: reading message contents from the second log entry, the message contents being unstructured data, and translating the unstructured data to a second identified message of the identified messages.

Obtaining the identified messages may further include making a determination that a second log entry of the log entries does not include any of the identified messages; and based on the determination: identifying a pattern of the second log entry, and pattern matching the pattern to a second identified message of the identified messages.

The method may also include predicting, with the inference model and based on the identified messages and the temporal relationships between the identified messages, an occurrence time for the future impairment.

Additionally, the method may include predicting, with the inference model and based on the identified messages and the temporal relationships between the identified messages, a second future impairment of the deployment; obtaining a confidence level for the future impairment and a confidence level for the second future impairment; and discarding, based on the confidence level for the second future impairment, the second future impairment prior to performing the action set.

The inference model may be based, at least in part, on a time relationship between: a previous occurrence of an identified message pattern; and a previous occurrence of an impairment of a monitored deployment.

The identified message pattern may include a series of a first number of log events in a predetermined order.

The inference model may be further based, at least in part, on a second time relationship between: a previous occurrence of a second identified message pattern; and the previous occurrence of the impairment of the monitored deployment.

The second identified message pattern may include a second series of a second number of the log events in the predetermined order, the second number being different from the first number.

The second identified message pattern may include a second series of the first number of the log events in the predetermined order, the second series of the first number of the log events comprising a portion of the log events of the first series of the first number of log events and at least one other log event of the log events.

The at least one other log event, in the predetermined order, may immediately precede or follow the log events of the first series of the first number of the log events in the predetermined order.

The identified message pattern may be one of a multiple message patterns, each of the message patterns being based on a corresponding window size and a corresponding increment size for selecting a portion of log events of the logs for the respective message pattern.

The inference model may not be based on any labeled data.

A non-transitory media may include instructions that when executed by a processor cause the computer-implemented method to be performed.

A data processing system may include the non-transitory media and a processor, and may perform the computer-implemented method when the computer instructions are executed by the process.

Turning to FIG. 1, a block diagram illustrating a system in accordance with an embodiment is shown. The system shown in FIG. 1 may provide computer implemented services. The system may include deployment 100. Deployment 100 may include any number of computing devices that provide the computer implemented services. For example, deployment 100 may include one or more system 102, 104 that may independently and/or cooperatively provide the computer implemented services.

For example, all, or a portion, of systems 102-104 of deployment 100 may provide computer implemented services to users and/or other computing devices operably connected to deployment 100. The computer implemented services may include any type and quantity of services including, for example, database services, instant messaging services, video conferencing services, etc. Different systems may provide similar and/or different computer implemented services.

To provide the computer implemented services, deployment 100 may host applications that provide these (and/or other) computer implemented services. The applications may be hosted by one or more of systems 102, 104 of deployment 100.

Any of systems 102-104, and components thereof, as well as hosted entities (e.g., applications that provide computer implemented services, other applications that manage the operation of deployment 100, etc.) may be subject to undesired operation. For example, due to various operating conditions, flaws in design, and/or for other reasons, any of these hardware and/or software components may operate in a manner that diverges from nominal (e.g., desired) operation.

When operating, any of these components may generate one or more logs. A log may be a data structure that include operational information regarding deployment 100 such as, for example, descriptions of conditions encountered by a component, a time when the condition was encountered, an identifier associated with a condition and/or generator of the log, an indication of a relative level of importance or severity of the encountered conditions, and/or other types of information. While the logs may include information regarding the current operation of deployment 100, the logs may not specify how the deployment 100 and/or components thereof are likely to operate in the future. Rather, the logs may generally include a representation of current and/or past operation of deployment 100, rather than including information regarding the future operation of deployment 100 and/or components thereof. Thus, while useful for diagnosing and/or correcting past problems, the logs may not be useful for proactively addressing potential future operating conditions of deployment 100 that may not be desirable.

In general, embodiments disclosed herein may provide systems, devices, and methods for proactively managing deployments to reduce the likelihood of the deployments operating in an undesired manager. A system in accordance with an embodiment may include deployment manager 110. Deployment manager 110 may generate predictions of future operating behavior of deployment 100 (and/or components thereof) and use the predictions to reduce the likelihood of deployment 100 operating in an undesired manner in the future.

To provide its functionality, deployment manager 110 may (i) collect logs for the hardware and/or software components of deployment 100, (ii) process the collected logs to identify indicators of likely future operation of deployment 100, (iii) generate future operating behavior predictions for deployment 100 using the identified indicators, and/or (iv) when the future operating behavior predictions indicate undesirable behavior, perform one or more actions (e.g., an "action set") to reduce the likelihood of deployment 100 operating performing the undesirable behavior in the future. By doing so, a system in accordance with embodiments disclosed herein may provide deployments having, for example, (i) improved uptime, (ii) improved user experiences by avoiding phantom slowdowns and/or pauses (e.g., due to undesired operating behavior), and/or (iii) improve computing resource availability for desired computer implemented services by reducing computing resource expenditures for management and/or remedial action.

When providing its functionality, deployment manager may perform all, or a portion, of the methods and/or actions shown in FIGS. 3A-5F.

Deployment 100, systems 102-104, and/or deployment manager 110 may be implemented using a computing device such as a host or server, a personal computer (e.g., desktops, laptops, and tablets), a "thin" client, a personal digital assistant (PDA), a Web enabled appliance, or a mobile phone (e.g., Smartphone), an embedded system, local controllers, and/or any other type of data processing device or system. For additional details regarding computing devices, refer to FIG. 6.

Any of the components illustrated in FIG. 1 may be operably connected to each other (and/or components not illustrated) with a communication system 105. In an embodiment, communication system 105 includes one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as included a limited number of specific components, a system in accordance with an embodiment may include fewer, additional, and/or different components than those illustrated therein.

Figure 2A:
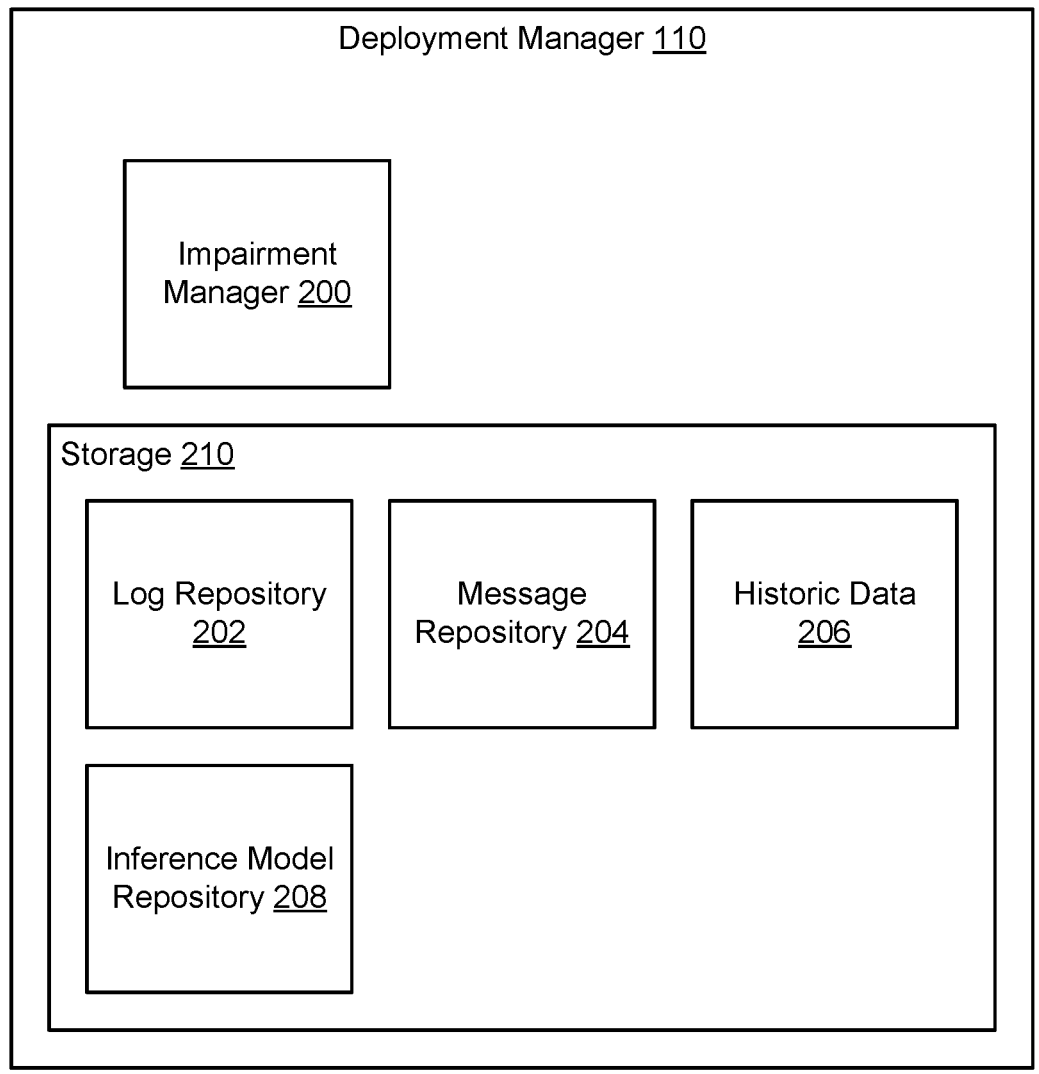
FIG. 2A shows a block diagram illustrating a deployment manager in accordance with an embodiment.

Turning to FIG. 2A, a diagram of deployment manager 110 in accordance with an embodiment is shown. Deployment manager 110 may provide deployment management services. The deployment management services may provide for proactive identification and/or remediation of undesired operation of a deployment that may occur in the future. To provide its functionality, deployment manager 110 may include impairment manager 200 and storage 210. Each of these components is discussed below.

Impairment manager 200 may (e.g., to provide all, or a portion, of the deployment management services): (i) obtain historic data 206 regarding the operation of one or more deployments, (ii) obtain one or more inference models and store the one or more inference models in inference model repository 208 (and/or other locations), (iii) obtain one or more logs for a deployment and store the one or more logs in log repository 202, (iv) obtain message identifiers for one or more log events from the logs in log repository 202 and the store the message identifiers (e.g., in message repository 204), (v) generate future operation predictions for the one or more deployments using the inference models from inference model repository 208, the message identifiers in message repository 204, and/or the logs in log repository 202, and/or (vi) use the future operation predictions for the one or more deployments to manage the deployments (e.g., by perform action sets to correct undesired operation behavior indicated by the future operation predictions).

Figure 2B:
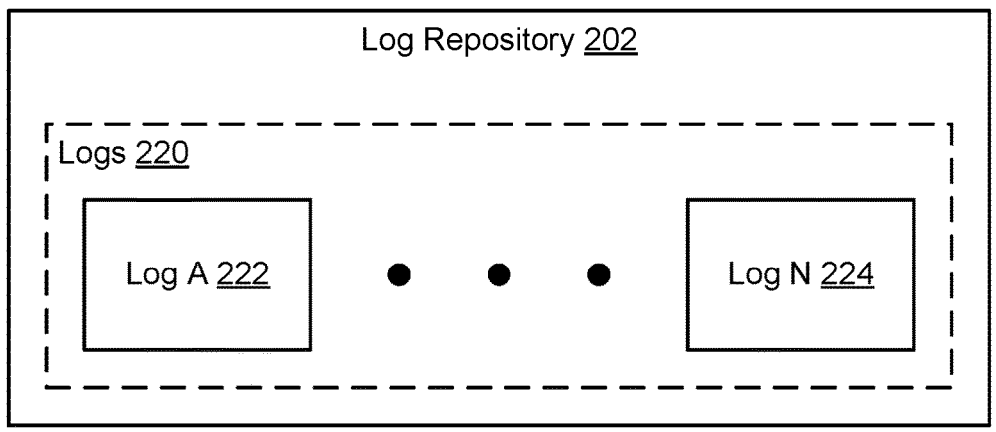
FIG. 2B shows a block diagram illustrating a log repository in accordance with an embodiment.
Figure 2C:
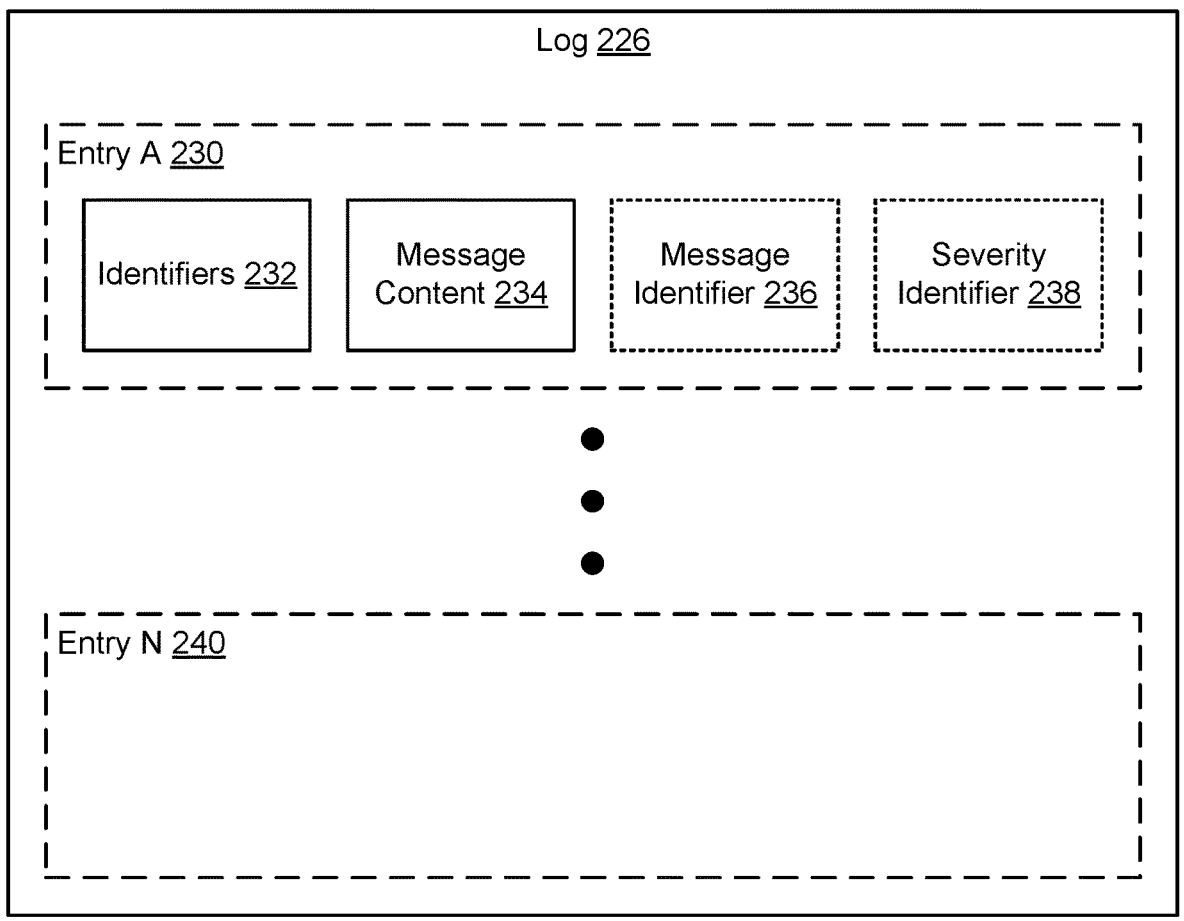
FIG. 2C shows a block diagram illustrating a log in accordance with an embodiment.

In an embodiment, historic data 206 includes training data usable to train a machine learning model. Historic data 206 may be obtained using one or more logs corresponding to a previous period of time. The logs may include one or more relationships between message identifiers corresponding to log events in the logs and the occurrence of events after the occurrence of the log events. Refer to FIG. 2E for additional details regarding historic data 206.

In an embodiment, inference model repository 208 include one or more inference models. The inference models may be trained using historic data 206 to generate predictions of events that are likely to occur in the future based on patterns of message identifiers included in log events of logs. In addition to predicting types of events that are likely to occur in the future, the inference models may also when such events are likely to occur in the future (e.g., a time to event prediction).

In an embodiment, the inference models are obtained by feeding historic data 206 into a machine learning (e.g., a deep learning) model. In an embodiment, a deep learning-based model is used to predict both a "time for failure" and a "failure event" by using the same feature representation layers.

In an embodiment, the "time for failure" and the "failure event" are separated and predicted with different models.

In an embodiment, the inference models generate the inferences by treating events identified by message identifiers as tokens. An embedding layer may be used to vectorize these tokens.

In an embodiment, the embedding is subsequently passed to long term short term memory (LSTM) or gated recurring (GRU) units to encode the time series relation between the tokens. These encoded states may then be passed to a softmax activation and linear layer to predict the "failure event" and "time for failure" respectively.

In an embodiment, a transformer-based model with positional encoding is used to speed up and generate more accurate predictions and speed up training processes.

In an embodiment, historic data 206 is used to train the inference models by establishing one or more relationships between the occurrence of patterns of message identifiers (corresponding to log events) and the occurrence of events subsequent to the occurrence of the patterns of message identifiers. For example, when a series of message identifiers occur, the relationships may be established by selecting portions of the message identifiers as the patterns based on different windows (e.g., number of message identifiers in a pattern) and increments (e.g., which message identifier in a series to start a pattern with). The aforementioned process may be repeated to generate a number of different message identifier patterns for a single event. These different message patterns may be used to train inference models to generate multiple predictions, and confidence scores for the multiple predictions may be used to select which of the multiple predictions to act on for deployment management purposes.

In an embodiment, message repository 204 include (i) information regarding messages identifiers for log events of logs in log repository 202 and/or (ii) information usable to obtain message identifiers for log events. As will be discussed in greater detail below, in some cases, the logs of log repository 202 may not indicate a message identifier for a log event. In such a scenario, other information included in a log event may be usable to ascertain a message identifier for the log event.

In an embodiment, a message identifier indicates (i) a condition that occurred to cause the log event to be generated and/or added to a log and/or (ii) an entity that caused the log event to be generated. By training the inference models in inference model repository 208 with respect to message identifier pattern—event occurrence relationships, future predictions may be able to be generated without having access to labeled training data and/or specific rules that define how to respond to different types of log events based on the contents of the log events. In this manner, the inference models of inference model repository 208 may be broadly applicable to any type of system that generates logs because rules for responding to the contents of the logs may not need to be known for the inference models of inference model repository 208 to be obtained.

Figure 2D:
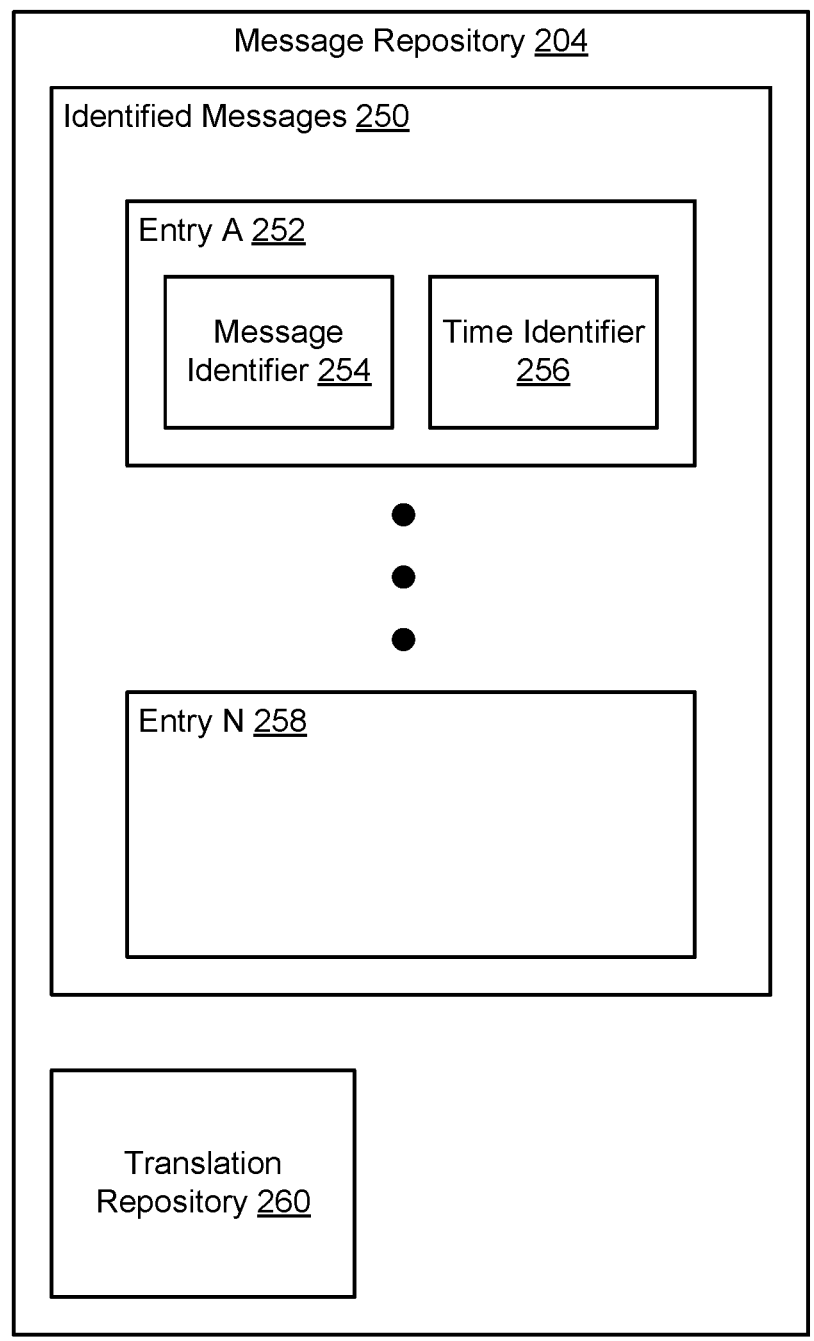
FIG. 2D shows a block diagram illustrating a message repository in accordance with an embodiment.
Figure 2E:
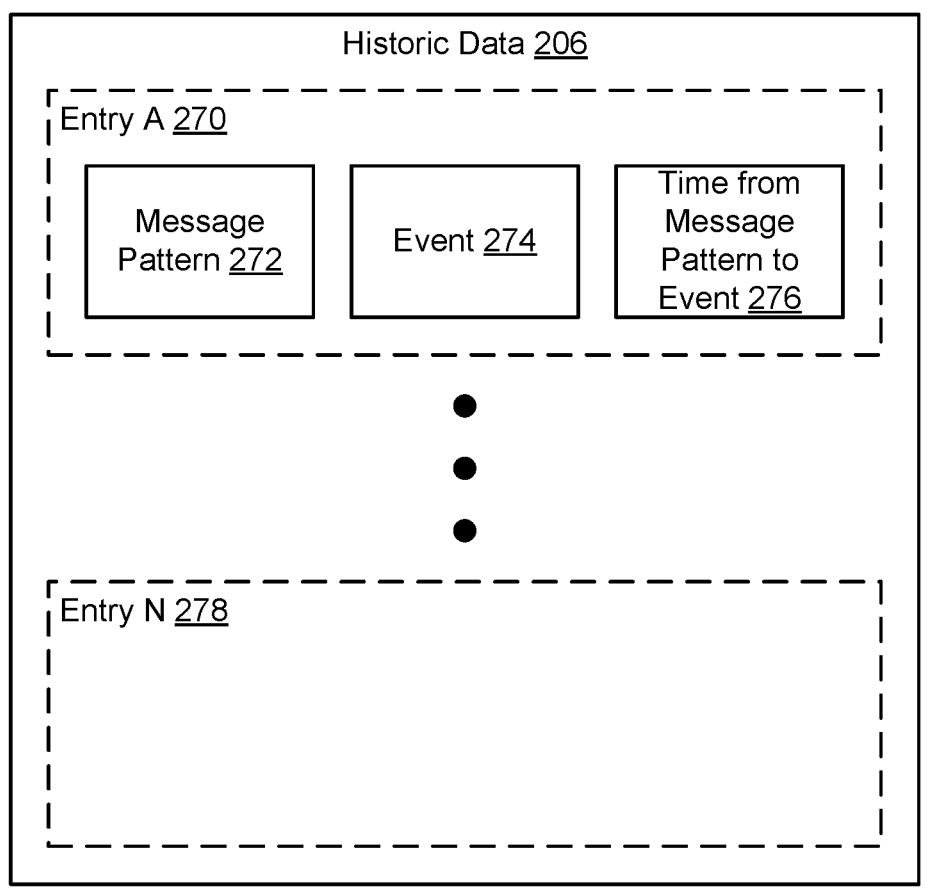
FIG. 2E shows a block diagram illustrating historic data in accordance with an embodiment.

For additional details regarding message repository 204, refer to FIG. 2D.

Log repository 202 may include any number of logs from any number of systems of any number of deployments. Refer to FIGS. 2B and 2C for additional details regarding log repository 202.

When providing its functionality, impairment manager 200 may perform all, or a portion, of the operations of methods and/or actions discussed with respect to FIGS. 3A-4F.

In an embodiment, impairment manager 200 is implemented using a hardware device including circuitry. The hardware device may be, for example, a digital signal processor, a field programmable gate array, or an application specific integrated circuit. The circuitry may be adapted to cause the hardware device to perform the functionality of impairment manager 200. Impairment manager 200 may be implemented using other types of hardware devices without departing from embodiments disclosed herein.

In one embodiment, impairment manager 200 is implemented using a processor adapted to execute computing code stored on a persistent storage that when executed by the processor performs the functionality of impairment manager 200 discussed throughout this application. The processor may be a hardware processor including circuitry such as, for example, a central processing unit or a microcontroller. The processor may be other types of hardware devices for processing digital information without departing from embodiments disclosed herein.

When providing its functionality, impairment manager 200 may store data and use data stored in storage 210.

In an embodiment, storage 210 is implemented using physical devices that provide data storage services (e.g., storing data and providing copies of previously stored data). The devices that provide data storage services may include hardware devices and/or logical devices. For example, storage 210 may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage 210 may include a memory device (e.g., a dual in line memory device) in which data is stored and from which copies of previously stored data are provided. In another example, storage 210 may include a persistent storage device (e.g., a solid-state disk drive) in which data is stored and from which copies of previously stored data is provided. In a still further example, storage 210 may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

Storage 210 may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

While illustrated in FIG. 2A as including a limited number of specific components, a deployment manager in accordance with an embodiment may include fewer, additional, and/or different components than shown in FIG. 2A.

Turning to FIGS. 2B-2E, these figures may illustrate data structures usable by components of the system of FIG. 1. Any of these data structures may be implemented using, for example, lists, tables, databases, linked lists, and/or other type of data structures. Any of the data structures may be shared, spanned across multiple devices, and may be maintained and used by any number of entities. Additionally, while illustrated as including a limited amount of specific data, any of these data structures may include additional, less, and/or different data without departing from embodiments disclosed herein.

Turning to FIG. 2B, a diagram of log repository 202 in accordance with an embodiment is shown. Log repository 202 may include any number of logs 220 from any number of deployments. Some of logs 220 may correspond to previous periods of time and may be used to generate the historic data.

Other logs of logs 220 may correspond to a current period of time and may be used to generate future operating predictions for a deployment. For example, the other logs of logs 220 may be used as input to inference models which generate the future operating predictions.

Over time, the number and quantity of logs 220 in log repository 202 may change. For example, as some of the logs (e.g., 222) may be removed while other logs (e.g., 224) may be added. Consequently, the contents of log repository 202 may be updated over time to reflect more recent activity of one or more deployments.

Turning to FIG. 2C, a diagram of log 226 in accordance with an embodiment is shown. Any of logs 220 may be similar to log 226. Log 226 may be for a component of a deployment.

Log 226 may include any number of entries 230, 240. An entry may correspond to a log event. Each entry 230, 240 may include one or more identifiers 232, a message content 234, a message identifier 236, and/or a severity identifier 238. Message identifiers 236 and severity identifiers 238 are illustrated with dashed outlining to indicate that in an embodiment one or more of these is not included in at least one entry of log 226.

Identifiers 232 may include one or more identifiers that (i) identify the entry (e.g., 230) and/or (ii) identifier a period of point of time associated with the entry (e.g., a time stamp corresponding to when generation of the entry was triggered, completed, initiated, etc.). For example, the identifier of the entry may be implemented with a unique identifier (e.g., that distinguishes the entry from other entries).

Message content 234 may include unstructured data (e.g., a string of text) that includes any type and content of information. In an embodiment, the unstructured data does not explicitly identify a condition that caused the entry to be generated or an entity that caused the entry to be generated. For example, the unstructured data may include information that is tangential to the occurrence of the condition and entity that caused the entry to be generated.

Message identifier 236 may include an identifier of a message associated with the entry and log event there associated with the entry. The message identifier 236 may be associated with an occurrence of a condition and entity that caused the entry to be generated, in contrast to message content 234. In an embodiment, message identifier 236 does not explicitly specify the occurrence of a condition and the entity that caused the entry to be generated. Rather, the message identifier 236 may be implemented with a string, bit sequence, etc. that allows various entries to be discriminated from one another with respect to occurrences of condition and/or generating entities.

For example, when a read error of a storage device occurs, a log entry for the read error may be generated. The log entry may include a message contents that may specify, for example, a block to which the read was attempted but failed. However, the message contents may not specify that a read error occurred (e.g., the event that caused the log entry to be generated), nor that a software service executing on the storage device caused the log entry to be generated. In contrast, the message identifier of the entry may include information usable to identify other entries that were generated due to the same cause (i.e., the read error) and by the same entity (i.e., the service).

Severity identifier 238 may include an identity of a severity level of an occurrence of an event associated with the entry. Severity identifier 238 may be usable to distinguish entries corresponding to events that may cause a deployment to operate in an undesired manner (e.g., an impaired manner) from other entries that correspond to events that do not cause the deployment to operate in the undesired manner (e.g., in a nominal manner). For example, severity identifier 238 may include one of multiple identifiers, with some of the multiple identifiers being associated with a deployment operating in an undesired manner. If an entry does not include a severity identifier 238, the message contents may be used to pattern match the entry to a corresponding severity level using, for example, heuristically determined associations between message contents and corresponding severity levels.

Turning to FIG. 2D, a diagram of message repository 204 in accordance with an embodiment is shown. In an embodiment, message repository 204 may be implemented as an in-memory data structure and may not be stored for persistent storage (e.g., because the contents of message repository 204 may be derived from the contents of logs stored in log repository 202).

Message repository 204 may include any number of identified messages 250. Each of these identified message may correspond to respective log events. The identified messages 250 may be arranged as, for example, entries 252, 258. Each of the entries 252, 258 may include a message identifier 254 for a corresponding identified message and/or a time identifier associated with a log event corresponding to the message identifier.

Some or all of message identifiers may be read from log events of logs when the log events include the message identifiers. For log events that do not include message identifiers, the message identifiers may be obtained by using translation data from translation repository 260 to map the message content (e.g., 234) from a log entry to a corresponding message identifier. Translation repository 260 may include any type and quantity of information usable to map message contents to corresponding message identifiers. In some cases, translation repository 260 may not include translation data for some message contents. In such scenarios, pattern matching may be performed to (i) generate a message identifier for the message contents and/or (ii) update translation repository 260 with data usable to translate similar message contents to the generated message identifier. Thus, when other log events are encountered that include similar message contents, the message contents may be directly translated to a message identifier without needing to perform pattern matching.

The pattern matching may be performed via any method such as, for example, using a hash function to generate a hash for the message contents with the hash being the message identifier. The hash function may be selected such that similar message contents are likely to be mapped to the same hash (e.g., the hash function may provide for significant hash collisions).

In an embodiment, the pattern matching is performed with key word extraction and matching. For example, noun-verb pairs or other relationships within the message contents may be used as the basis for mapping message contents to a message identifier.

In an embodiment, translation repository 260 is implemented as a dictionary look-up data structure. For example, translation repository 260 may include entries keyed to various contents of message contents from log events. Each entity may specify a corresponding message identifier. Consequently, the message contents (or portions thereof) may be matched to corresponding dictionary entries to identify the message identifiers for the log events of logs.

Message identifier 254 and time identifier 256 of one or more entries may be used (i) as input to an inference model and/or (ii) to generate historic data (e.g., with a portion of the entries corresponding to older logs that are being used for training purposes rather than for prediction purposes).

Turning to FIG. 2E, a diagram of historic data 206 in accordance with an embodiment is shown. Historic data 206 may be used to train one or more inference models. The content of historic data 206 may be obtained from one or more logs for a deployment.

Historic data 206 may be organized with any number of entries 270, 278. An entry (e.g., 270, 278) may include message pattern 272, event 274, and time from message pattern to event 276.

Message pattern 272 may specify a number of message identifiers and sequencing of the message identifiers based on log events (corresponding to the message identifiers) that is present in or obtainable from a log. For example, message pattern 272 may be implemented with a list that includes message identifiers, with the positions in the list indicating sequencing of the message identifiers with respect to one another.

For example, a log may specify a series of log events that include message identifiers ID1, ID2, ID3, ID4, and ID5 and another log event (temporally after the series of log events) that indicate the occurrence of an event associated with undesired operation of the deployment. In such a scenario, message pattern 272 may include information regarding a portion of the identifiers (e.g., ID1, ID2, ID3) and sequencing of the identifiers (e.g., based on temporal information such as time stamps included in the log events). The number of message identifiers and the selection of message identifiers included in a message pattern may depend on a window used for the message pattern and an increment used for the message pattern. Different entries may correspond to different windows and/or increments.

With respect to the previous example, if a window is noted as being 3 and the increment as being 2, then message pattern 272 may include ID2, ID3, and ID4. In contrast, if a window is noted as being 4 and the increment as being 1, then message pattern 272 may include ID1, ID2, ID3, and ID4.

Event 274 may specify the occurrence of an event that had an undesired impact on the operation of a deployment. Event 274 may be based on a log event of a log that occurred after the log events on which message pattern 272 occurred. Event 274 may specify, for example, a severity level of an event, an indicator of the event, and/or other information regarding the vent. In an embodiment, one or more of entries 270, 278 do not include event 274.

Time from message pattern to event 276 may specify a temporal relationship between an occurrence of log events on which message pattern 272 is based on a log even on which event 274 is based. For example, time from message pattern to event 276 may specify a time delta in terms of second, minutes, hours, days, etc. In an embodiment, time from message pattern to event 276 may also specify a time range. The combination of the time delta and the range may indicate a time window after the occurrence of the log events on which message pattern 272 is based.

The contents of the entries may define relationships on which one or more inference models are based. For example, the contents of some of entries 270, 278 may be used to train an inference model thereby allowing the inference model to predict the occurrence of future events and the time to the occurrence of such events. For example, the trained inference models may operate on message identifier patterns included in log entries and output event and time to event predictions.

Figure 3A:
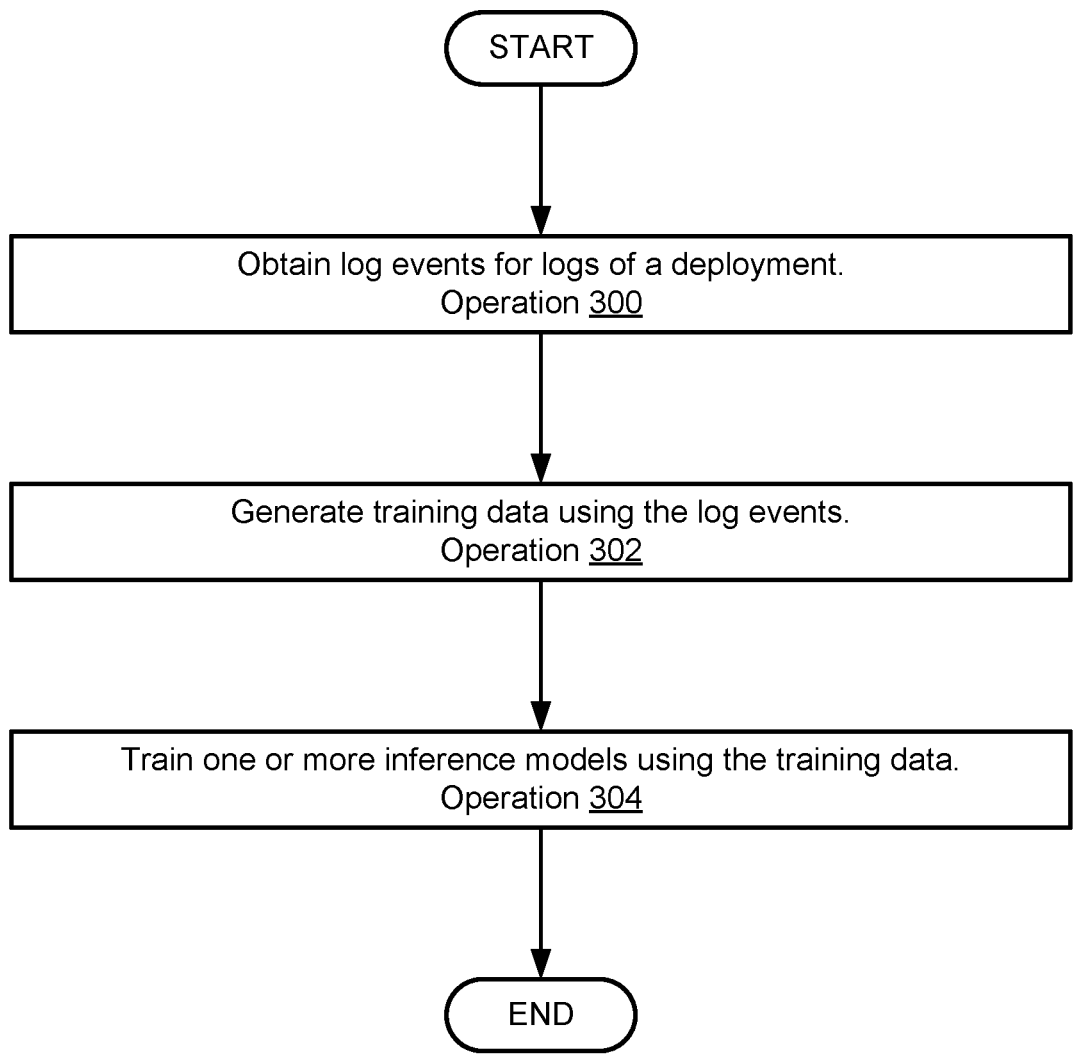
FIG. 3A shows a flow diagram illustrating a method of obtaining an inference model in accordance with an embodiment.
Figure 3B:
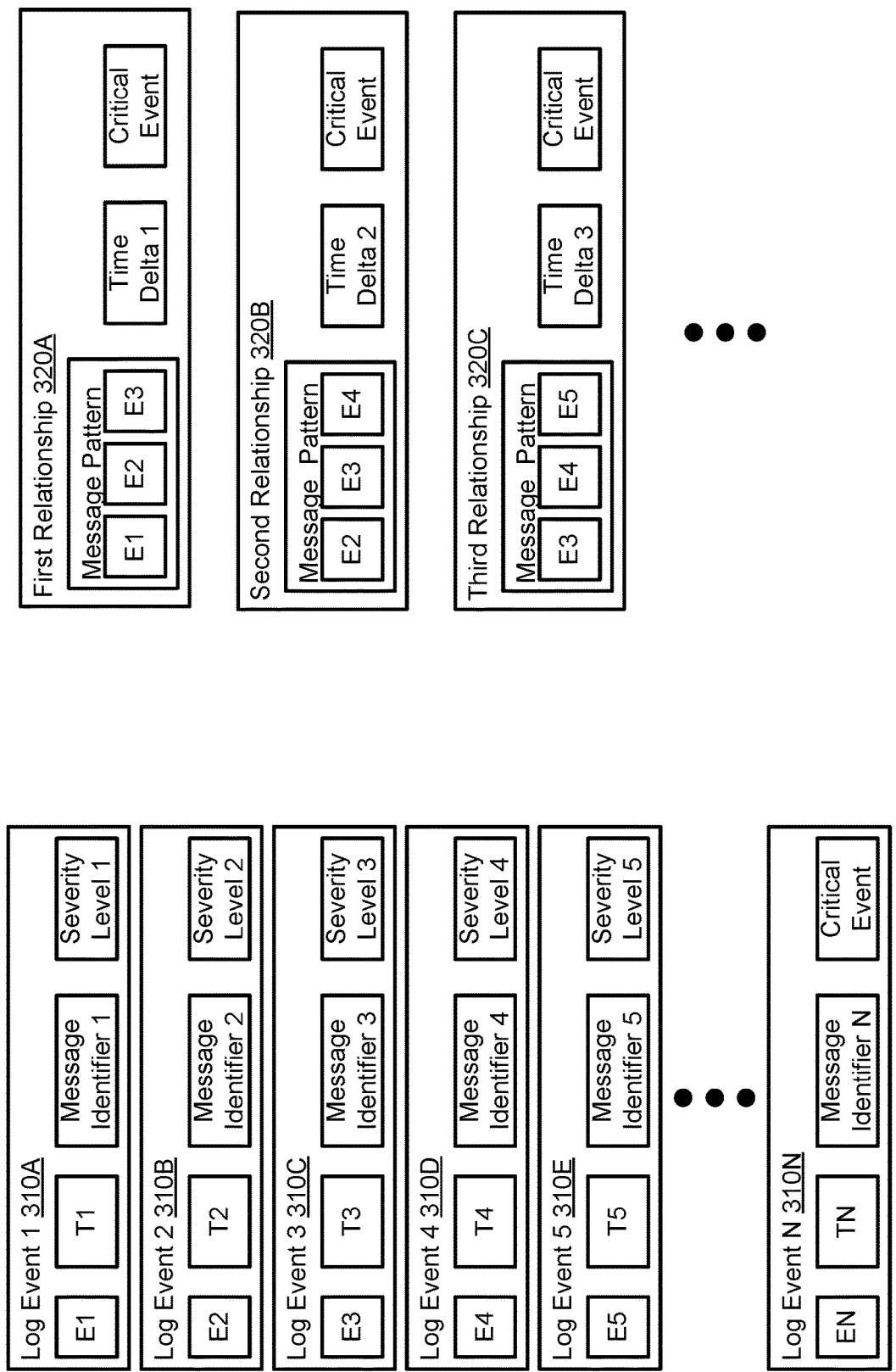
FIG. 3B shows a block diagram illustrating log events and training data in accordance with an embodiment.

Refer to FIG. 3B for additional details regarding generation of historic data.

Figure 4A:
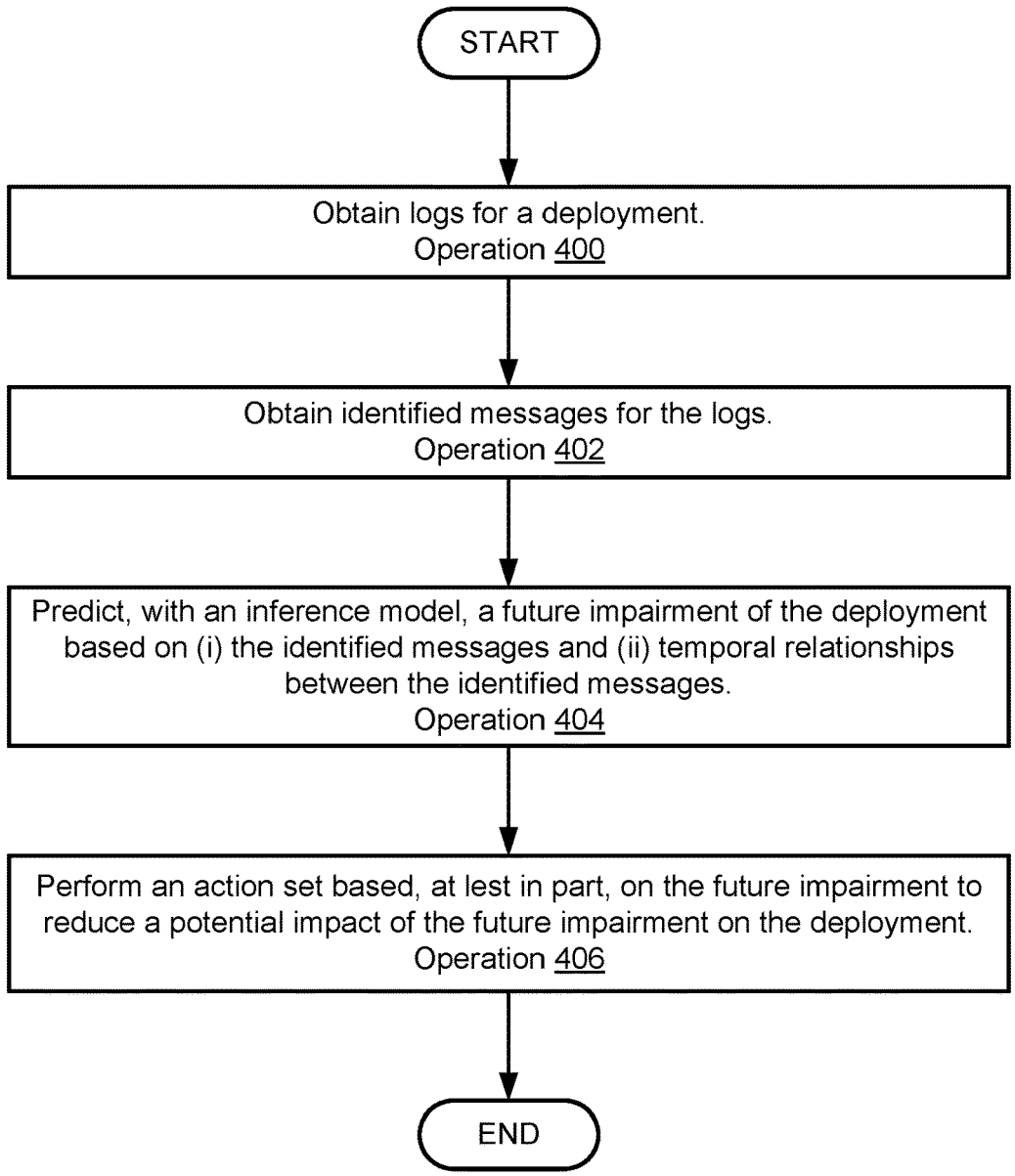
FIG. 4A shows a flow diagram illustrating a method of managing the operation of a deployment in accordance with an embodiment.
Figure 4B:
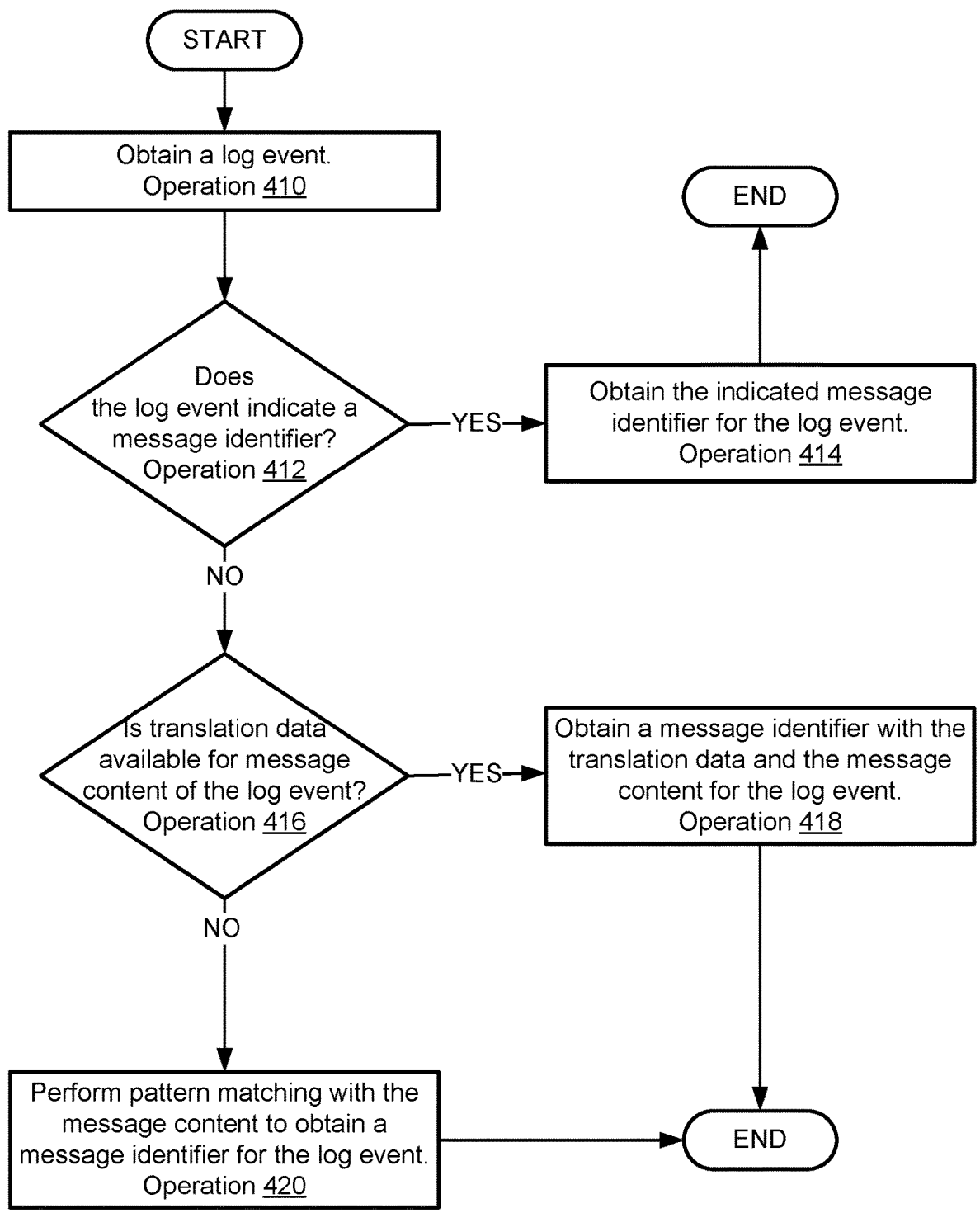
FIG. 4B shows a flow diagram illustrating a method of obtaining message identifiers in accordance with an embodiment.

As discussed above, the components of FIG. 1 may perform various methods to increase the likelihood of a deployment being able to provide computer implemented services. FIGS. 3A, 4A, and 4B illustrate methods that may be performed by the components of FIG. 1. In the diagrams discussed below and shown in FIGS. 3A, 4A, and 4B, any of the operations may be repeated, performed in different orders, and/or performed in parallel with or in a partially overlapping in time manner with other operations.

Turning to FIG. 3A, a flow diagram illustrating a method of obtaining an inference model in accordance with an embodiment is shown.

At operation 300, log events for logs of a deployment are obtained. The log events may be obtained from the logs. The logs may be stored in a log repository and/or may be stored in other locations.

At operation 302, training data is generated using the log events. The training data may be obtained by obtaining message identifiers corresponding to log events that occurred prior to a predetermined event in the log events, temporal data for the log events, and temporal data for the predetermined event. The predetermined event may be an undesired operation of a deployment, and the log events may correspond to deployment events that occurred prior to the undesired operation of the deployment.

The log events that occurred prior to a predetermined event in the log events may be used to obtain message patterns using various window sizes and increments. By doing so, a range of different relationships (corresponding to the different window sizes and increments) between message patterns and the predetermined event may be formed.

Temporal relationships between each of the message patterns and the predetermined event may be obtained and used to generate the training data. For example, the time stamp of the last log event on which a message pattern is based and a time of the predetermined event may be used to identify a time delta. The historic data may be obtained by establishing any number of such relationships such as, for example, <Message Pattern 1, delta 1>, <Message Pattern 2, delta 2>, <Message Pattern 3, delta 3> . . . <Message Pattern N, delta N>. Refer to FIG. 3B for additional details regarding generating training data.

At operation 304, one or more inference models are trained using the training data. The inference models may be implemented with, for example, machine learning models. The trained inference models may take a sequence of message identifiers as input (e.g., corresponding to a sequence of log entries) and generate one or more output specifying (i) a prediction of a future occurrence of undesired operation (e.g., an event) of a deployment and (ii) a predicted time until the occurrence.

The trained inference models may also be usable to calculate confidence scores for the output. The confidence scores may be based, at least in part, on a similarity of the input to the training data used to train the one or more inference models.

In an embodiment, the confidence scores are used to select one or more of the output (e.g., one or more of the predictions) for presentation and/or use. For example, the one or more outputs may be ranked based on the corresponding confidence scores. The best ranked or some portion ranked over a confidence threshold may be used as the output of the trained inference models.

The method may end following operation 304.

Turning to FIG. 3B, a diagram illustrating a process of generating training data in accordance with an embodiment is shown. In FIG. 3B, log events 310A-310N are obtained from one or more logs. The logs may correspond to past operation of a deployment.

One of the log events (e.g., 310N) may indicate the occurrence of an undesired operation of the deployment based on a severity level identifier included in the entry. In FIG. 3B, this is indicated by "critical event" in log event N 310N.

Each of the log events (310A-310E) preceding log event N 310N may be used for training generation purposes. A message identifier for each of the log events 310A-310E may be determined, and used to obtain message patterns for relationships 320A-320C in training data usable to train inference models. Different window sizes and increments may be used to establish the message patterns.

For example, first relationship 320A of the training data may specify a message pattern of E1, E2, and E3 corresponding to the first three log events 310A-310C. This message pattern may correspond to a window size of 3 and an increment of 1.

In another example, second relationship 320B of the training data may specify a message pattern of E2, E3, and E4 corresponding to the second through fourth log events 310B-310D. This message pattern may correspond to a window size of 3 and an increment of 2.

While not shown, a message pattern of E2, E3, E4, and E5 may correspond to a window size of 4 and an increment of 2.

Each of the relationships 320A-320C may also specify a corresponding time delta that relates the corresponding message pattern to the critical even. For example, time delta 1 of first relationship 320A may reflect the difference in time between a time stamp T3 of log event 3 310C and time stamp TN of log event N 310N. The time deltas may be based on different relationships (e.g., start of pattern to critical event, midpoint of pattern to critical event, etc.).

While the log events illustrated in FIG. 3B are shows as including corresponding message identifiers (e.g., message identifier 1-message identifier N), these should be understand as being the associated message identifiers whether read directly from the log events or obtained otherwise (e.g., through translation and/or pattern matching).

Turning to FIG. 4A, a flow diagram illustrating a method of managing the operation of a deployment in accordance with an embodiment is shown.

At operation 400, logs for a deployment are obtained. The obtained logs may reflect current operation of the deployment. The logs may be obtained from the deployment, read from a repository, or obtained via other methods.

At operation 402, identified messages for the logs are obtained. The identified message may be similar to those discussed with respect to FIG. 2D. The identified messages may be obtained by, for example, reading the message identifiers from log events of the logs, translating message contents of the logs to corresponding message identifiers, and/or performing pattern matching for the message contents of the log events of the logs to obtain the message identifiers. Refer to FIG. 4B for additional details regarding obtaining identified messages.

The identified messages may be ordered with respect to one another (e.g., a series or sequence of identified messages). The ordering may correspond to the ordering of the log events in the log entries. The ordering may define temporal relationships between the identified messages.

At operation 404, a future impairment of the deployment is predicted based on (i) the identified messages and (ii) temporal relationships between the identified messages. The identified messages may be fed to the inference model in an order based on the temporal relationships. For example, the identified messages may be fed in temporal order from those occurring earlier in time to those occurring later in time. This ordering may correspond to the ordering used in training data used to train the inference model.

The inference model may generate, as output, one or more predictions of deployment impairments and times to the deployment impairments. Additionally, the inference model may generate confidence scores corresponding to the one or more predictions. The confidence scores may be used to select some of the predictions for later use.

In an embodiment, predictions having a confidence score above a predetermined threshold are selected. In an embodiment, the predictions are ranked based on the confidence score and the highest ranked prediction is selected.

In an embodiment, the future impairment is a critical event included in training data used to train the inference model.

At operation 406, an action set base, at least in part, on the future impairment is performed to reduce a potential impact of the future impairment on the deployment. The action set may include (i) notifying an administrator of the future impairment, (ii) performing a reconfiguration of the deployment based on the future impairment, (iii) transferring workloads from the deployment to other deployments, and/or (iv) performing other actions that may reduce the likelihood of the impairment occurring.

The future impairment may, for example, reduce the functionality of the deployment, increase a downtime of the deployment, and/or otherwise reduce the ability of the deployment in providing it functionality.

The method may end following operation 406.

Turning to FIG. 4B, a flow diagram illustrating a method of obtaining identified messages in accordance with an embodiment is shown.

At operation 410, a log event is obtained. The log event may be obtained by reading it from a log.

At operation 412, it is determined whether the log event indicates a message identifier. The log event may indicate a message event by, for example, including the message identifier such that it is readable or directly inferable from the log event. If the message indicator is indicated by the log event, then the method may proceed to operation 414. Otherwise the method may proceed to operation 416 following operation 412.

At operation 414, the message identifier is obtained from the log event. The message identifier may be read from the log event. The message identifier may be used to generate an entry for the identified messages.

The method may end following operation 414.

Returning to operation 412, the method may proceed to operation 416 when the log event does not indicate a message identifier.

At operation 416, it is determined whether translation data is available for message content of the log event. The translation data may be, for example, a dictionary lookup data structure and may be stored. If the translation data is available, then the method may proceed to operation 418 following operation 416. Otherwise, the method may proceed to operation 420 when translation data is not available.

At operation 418, a message identifier is obtained with the translation data and the message content for the log event. For example, the message content may be used as a key to look up the message identifier with the translation data. The message identifier may be used to generate an entry for the identified messages.

The method may end following operation 418.

Returning to operation 416, the method may proceed to operation 420 when translation data for the message content of the log event is not available.

At operation 420, pattern matching is performed with the message content to obtain a message identifier for the log event. The pattern matching may be performed in such a manner that similar message content from other log events will map to the message identifier. In an embodiment, the translation data is updated with data to cause similar message content from other log events to translate to the message identifier. The message identifier may be used to generate an entry for the identified messages.

The method may end following operation 420.

Using the method illustrated in FIG. 4B, message identifiers for any number of log events may be obtained, regardless of whether a log event specifies the message identifiers.

Turning to FIGS. 5A-5F, these figures may illustrate a system similar to that of FIG. 1 in accordance with an embodiment. FIGS. 5A-5F may show actions performed by the system over time. The system may include deployment 500 that includes processing node 502 and storage node 504. These nodes may perform processing and storage respectively, and may generate logs over time. Deployment manager 110 may be operably connected to deployment 500 via communication system 105.

Figure 5A:
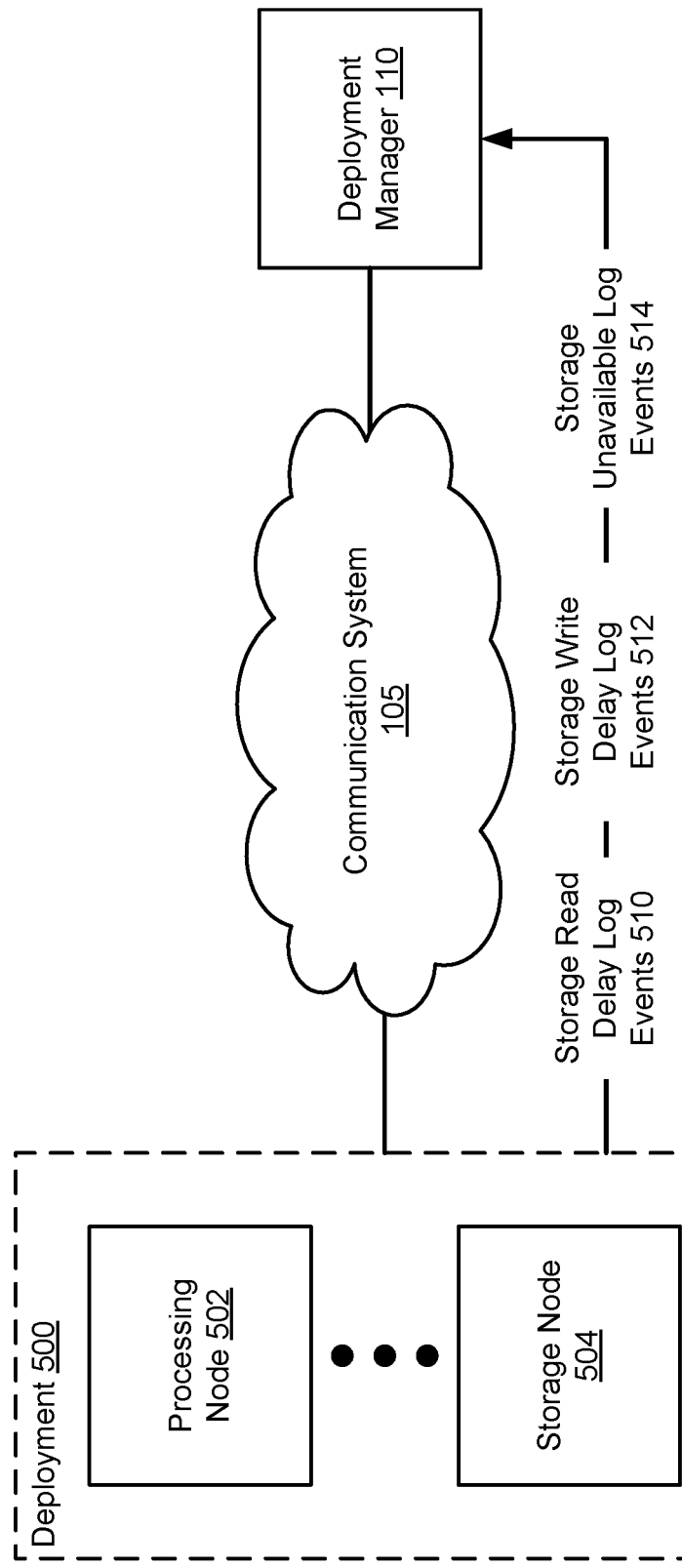
FIGS. 5A-5F show block diagrams illustrating system in accordance with an embodiment over time.

Turning to FIG. 5A, consider a scenario where deployment manager 110 obtains a number of log events 510, 512, and 514 from deployment. Storage read delay log events 510 may indicate the occurrences of delays is reads by storage node 504 from expected read times. Storage write delay log events 512 may indicate the occurrences of delays in writes by storage node 504 from expected write times. Storage unavailable log events 514 may indicate the occurrence of undesired operating behavior of deployment 500 where access to data in storage node 504 is unavailable, thereby impairing the functionality of deployment 500.

Using these log events, deployment manager 110 may obtain training data that reflects message identifier patterns corresponding to the log events of storage read delay log events 510 and storage write delay log events 512 that occurred prior to storage unavailable log events; and temporal relationships between these message identifier patterns and storage unavailable log events 514.

Figure 5B:
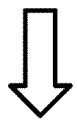
Figure 5B:
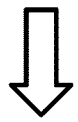
Figure 5B:
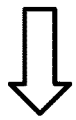
Figure 5B:
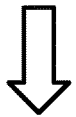

Deployment manager 110 may train an inference model based on the training data to obtain a trained inference model. Turning to FIG. 5B, an inference training process is illustrated where the log events 510, 512, 514 and used to perform a training data generation 520 process to obtaining training data 522. Training data 522 may then be used to perform an inference model training 524 process to obtain the trained inference model 530. For example, deployment manager 110 may perform the methods illustrated in FIGS. 3A and 3B.

Figure 5C:
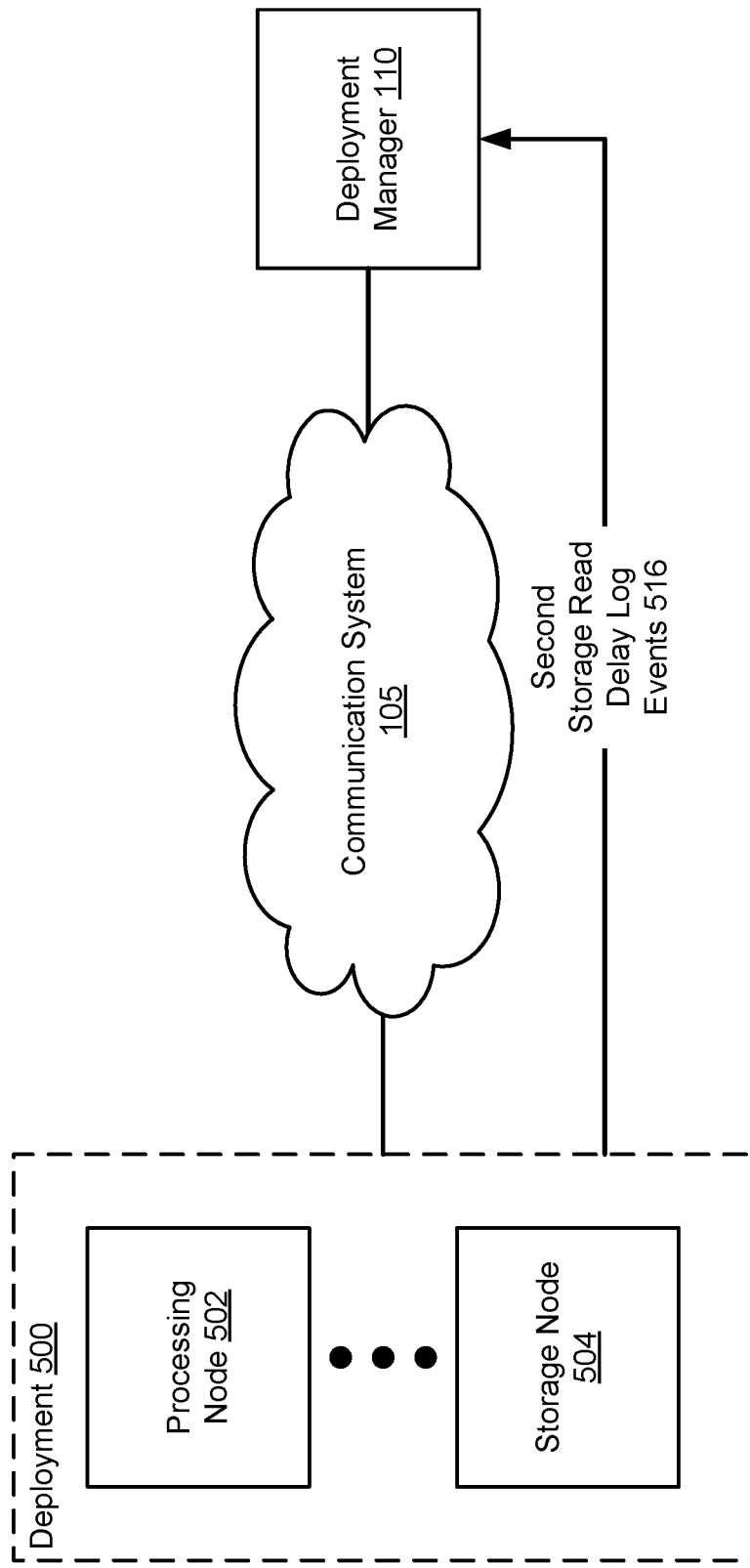

Turning to FIG. 5C, with the trained inference model, deployment manager 110 may begin collecting additional log events to attempt to prevent future unavailability of storage access for deployment 500. The additional log events may include second storage read delay log events 516.

Using these log events, predictions are generated with the trained inference model. However, none of the predictions indicate the occurrence of the unavailability of storage access for deployment 500.

Figure 5D:
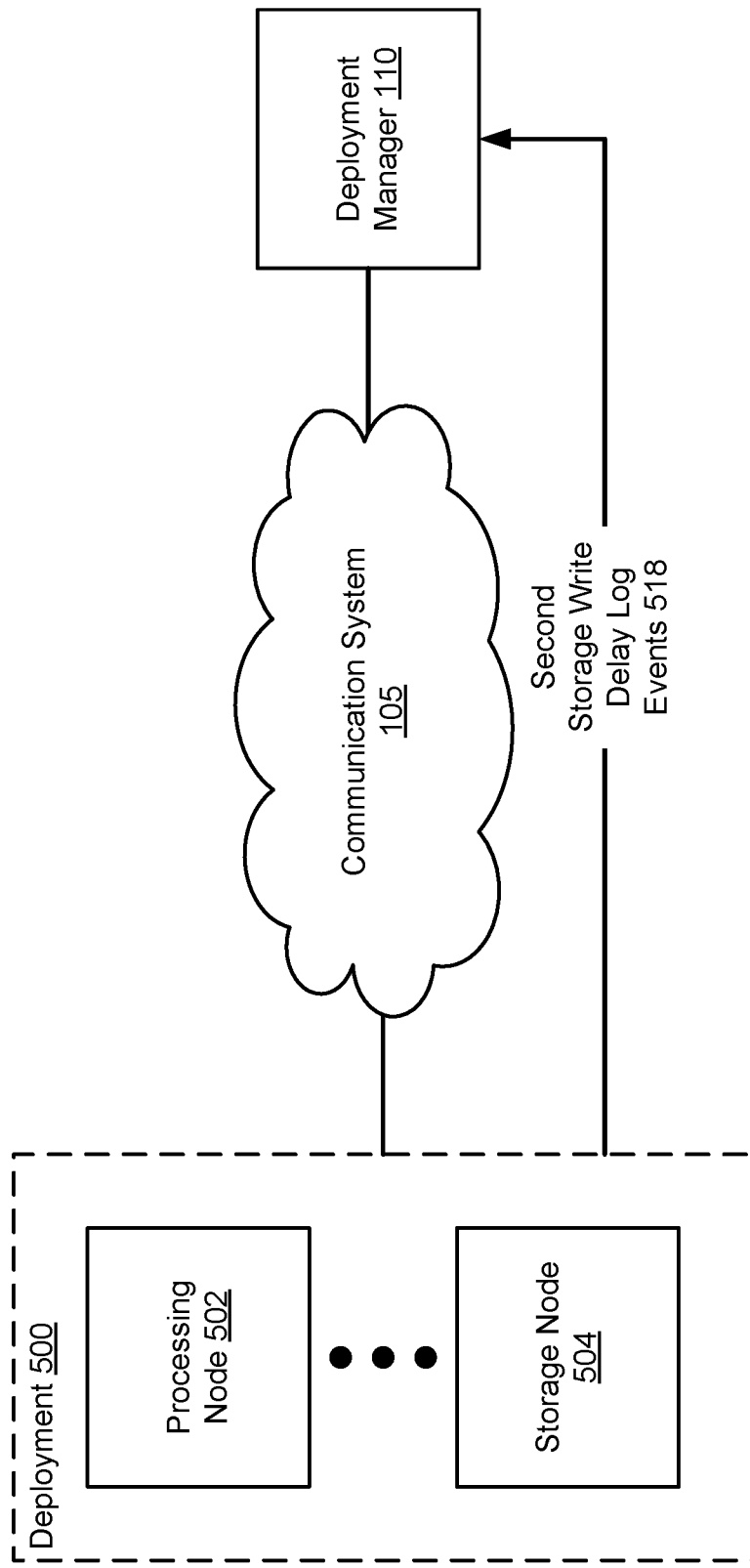

Turning to FIG. 5D, deployment manager 110 continues to obtain log events for deployment 500, including second storage write delay log events 518. In contrast to second storage read delay log events 516, when message identifiers corresponding to second storage write delay log events 518 are fed to the trained inference model, the trained inference model generates a storage unavailability prediction for deployment 500 with a time to occurrence of 24 hours.

Figure 5E:
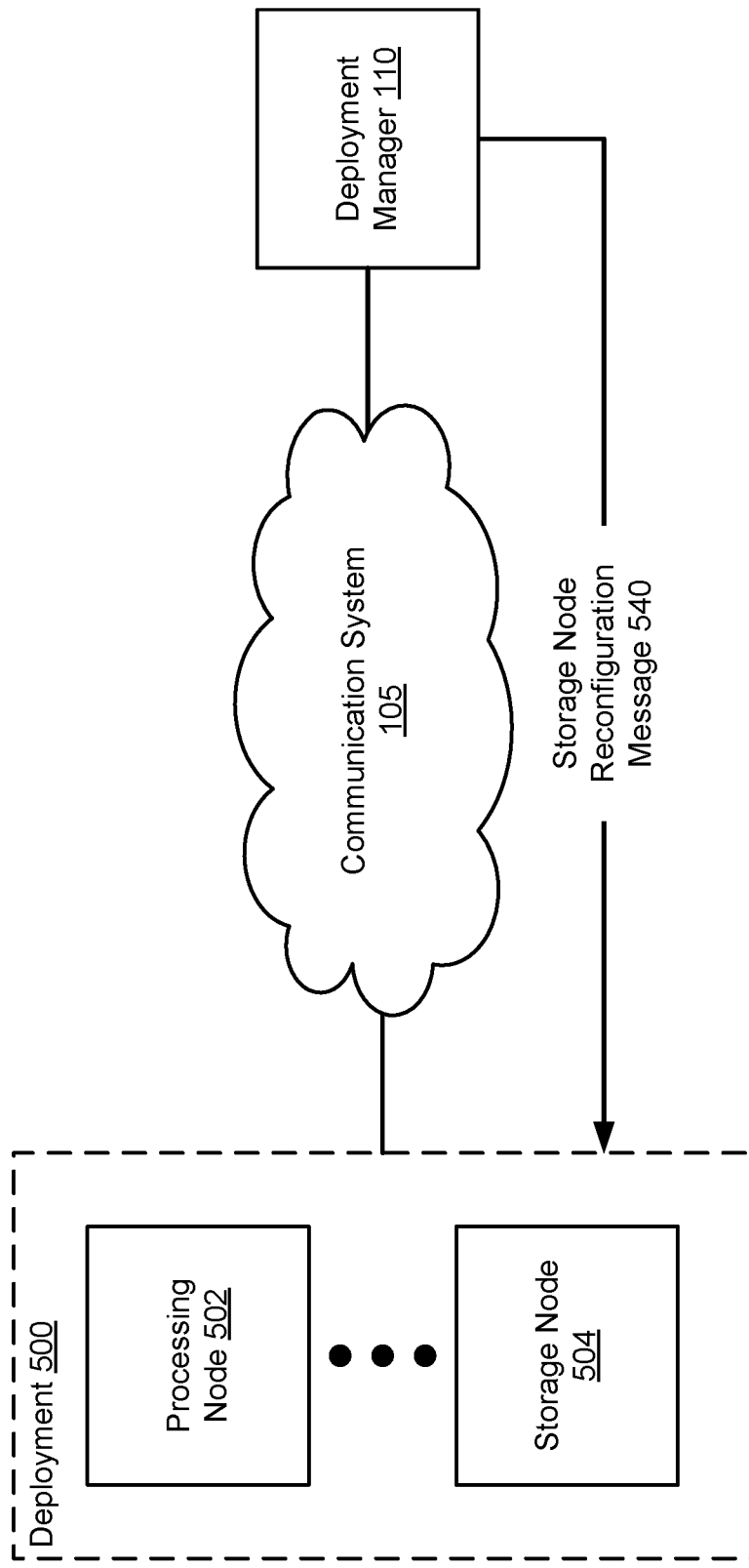
Figure 5F:
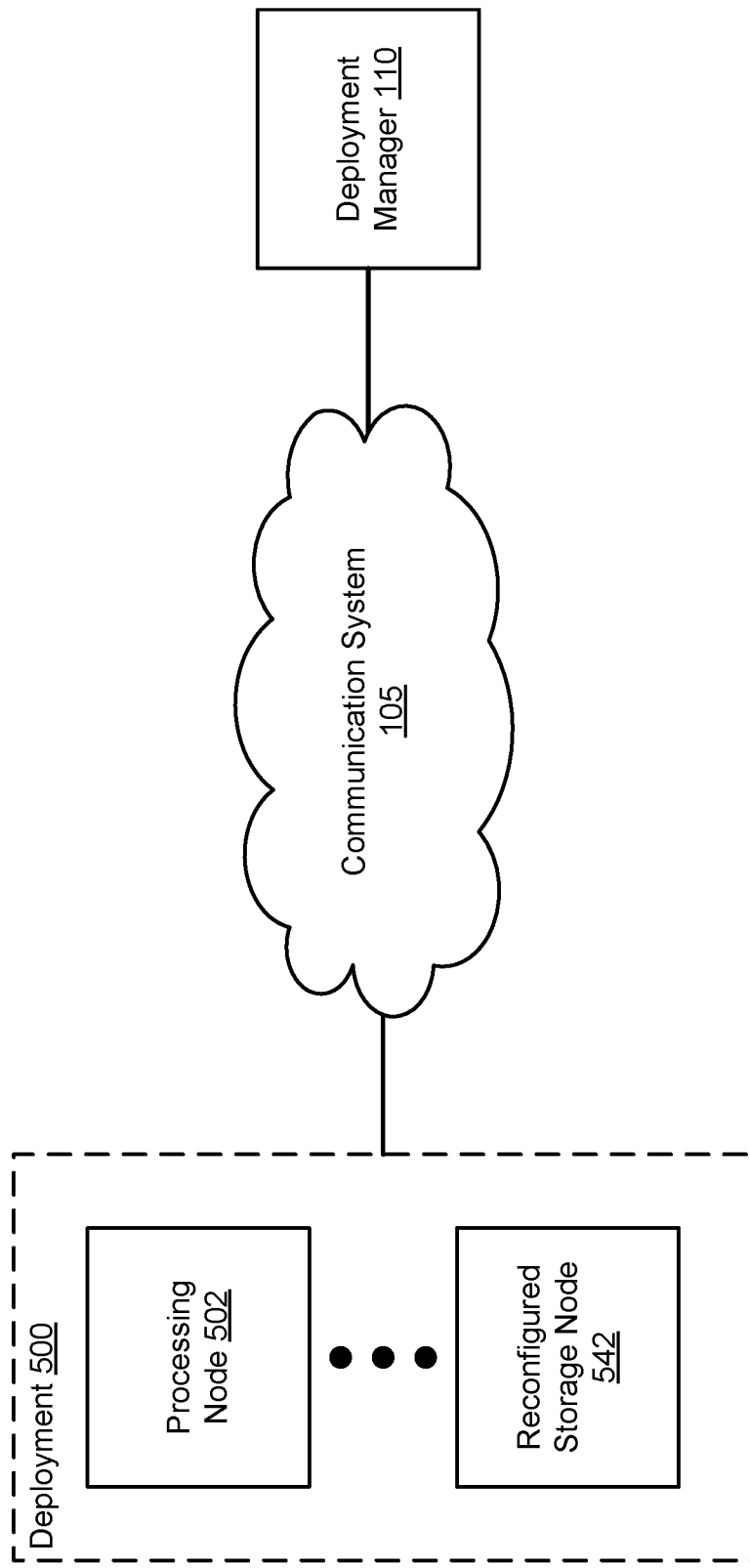

Turning to FIG. 5E, in response to the prediction, deployment manager 110 performs an action set by sending storage node reconfiguration message 540 to deployment 500 thereby reconfiguring the operation of storage node 504. Consequently, as seen in FIG. 5F, after reconfigured storage node 542 is obtained, the predicted storage unavailability for deployment 500 does not occur thereby increasing the uptime of deployment 500.

Figure 6:
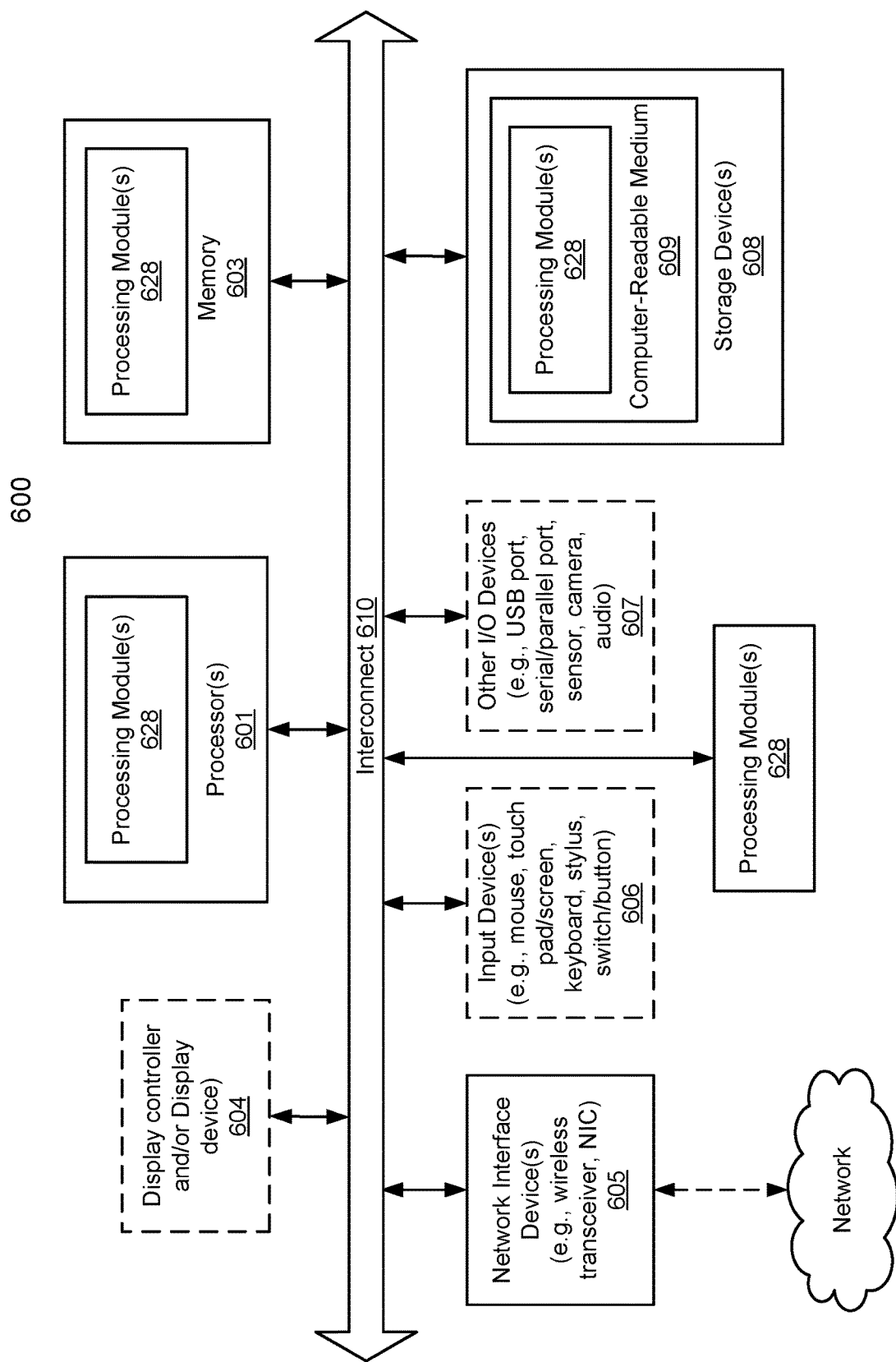
FIG. 6 shows a block diagram illustrating a data processing system in accordance with an embodiment.

Any of the components illustrated in FIGS. 1-5F may be implemented with one or more computing devices. Turning to FIG. 6, a block diagram illustrating an example of a data processing system (e.g., a computing device) in accordance with an embodiment is shown. For example, system 600 may represent any of data processing systems described above performing any of the processes or methods described above. System 600 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 600 is intended to show a high level view of many components of the computer system. However, it is to be understood that additional components may be present in certain implementations and furthermore, different arrangement of the components shown may occur in other implementations. System 600 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 600 includes processor 601, memory 603, and devices 605-608 via a bus or an interconnect 610. Processor 601 may represent a single processor or multiple processors with a single processor core or multiple processor cores included therein. Processor 601 may represent one or more general-purpose processors such as a microprocessor, a central processing unit (CPU), or the like. More particularly, processor 601 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 601 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a coprocessor, an embedded processor, or any other type of logic capable of processing instructions.

Processor 601, which may be a low power multi-core processor socket such as an ultra-low voltage processor, may act as a main processing unit and central hub for communication with the various components of the system. Such processor can be implemented as a system on chip (SoC). Processor 601 is configured to execute instructions for performing the operations discussed herein. System 600 may further include a graphics interface that communicates with optional graphics subsystem 604, which may include a display controller, a graphics processor, and/or a display device.

Processor 601 may communicate with memory 603, which in one embodiment can be implemented via multiple memory devices to provide for a given amount of system memory. Memory 603 may include one or more volatile storage (or memory) devices such as random access memory (RAM), dynamic RAM (DRAM), synchronous DRAM (SDRAM), static RAM (SRAM), or other types of storage devices. Memory 603 may store information including sequences of instructions that are executed by processor 601, or any other device. For example, executable code and/or data of a variety of operating systems, device drivers, firmware (e.g., input output basic system or BIOS), and/or applications can be loaded in memory 603 and executed by processor 601. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 600 may further include IO devices such as devices (e.g., 605, 606, 607, 608) including network interface device(s) 605, optional input device(s) 606, and other optional IO device(s) 607. Network interface device(s) 605 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 606 may include a mouse, a touch pad, a touch sensitive screen (which may be integrated with a display device of optional graphics subsystem 604), a pointer device such as a stylus, and/or a keyboard (e.g., physical keyboard or a virtual keyboard displayed as part of a touch sensitive screen). For example, input device(s) 606 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 607 may include an audio device. An audio device may include a speaker and/or a microphone to facilitate voice-enabled functions, such as voice recognition, voice replication, digital recording, and/or telephony functions. Other IO devices 607 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 607 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 610 via a sensor hub (not shown), while other devices such as a keyboard or thermal sensor may be controlled by an embedded controller (not shown), dependent upon the specific configuration or design of system 600.

To provide for persistent storage of information such as data, applications, one or more operating systems and so forth, a mass storage (not shown) may also couple to processor 601. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 601, e.g., via a serial peripheral interface (SPI). This flash device may provide for non-volatile storage of system software, including a basic input/output software (BIOS) as well as other firmware of the system.

Storage device 608 may include computer-readable storage medium 609 (also known as a machine-readable storage medium or a computer-readable medium) on which is stored one or more sets of instructions or software (e.g., processing module, unit, and/or processing module/unit/logic 628) embodying any one or more of the methodologies or functions described herein. Processing module/unit/logic 628 may represent any of the components described above. Processing module/unit/logic 628 may also reside, completely or at least partially, within memory 603 and/or within processor 601 during execution thereof by system 600, memory 603 and processor 601 also constituting machine-accessible storage media. Processing module/unit/logic 628 may further be transmitted or received over a network via network interface device(s) 605.

Computer-readable storage medium 609 may also be used to store some software functionalities described above persistently. While computer-readable storage medium 609 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 628, components and other features described herein can be implemented as discrete hardware components or integrated in the functionality of hardware components such as ASICS, FPGAs, DSPs or similar devices. In addition, processing module/unit/logic 628 can be implemented as firmware or functional circuitry within hardware devices. Further, processing module/unit/logic 628 can be implemented in any combination hardware devices and software components.

Note that while system 600 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A computer-implemented method for managing operation of a deployment by proactively identifying when the deployment is likely to enter an impairment state, the method comprising:
   obtaining logs for a deployment, the logs reflecting activity of the deployment that may be relevant to the impairment state;
   obtaining identified messages within the logs, wherein each identified message of the identified messages indicates:
      an entity of the deployment that generated a log entry of the logs corresponding to respective ones of the identified messages, and
      a condition associated with the log entry of the logs corresponding to the respective ones of the identified messages, and
      wherein each of the identified messages includes a message identifier that marks each of the identified messages as one of the identified messages and the message identifier is stored with first message contents of each of the identified messages;
   predicting, with an inference model, a future impairment of the deployment based on:
      the identified messages, and
      temporal relationships between the identified messages; and
   executing an action set based, at least in part, on the future impairment predicted by the inference model to reduce a potential impact of the future impairment on the deployment, wherein the action set is executed as a separate process from the predicting performed by the inference model.

2. The computer-implemented method of claim 1, wherein obtaining the identified messages comprises:
   for a first log entry of the log entries, reading the message identifier in the first log entry to identify the identified messages from the first log entry.

3. The computer-implemented method of claim 2, wherein obtaining the identified messages further comprises:
   making a determination that a second log entry of the log entries does not comprise any instance of the message identifier; and
   based on the determination:
      reading second message contents from the second log entry, the second message contents being unstructured data, and
      translating the unstructured data to a second identified message of the identified messages.

4. The computer-implemented method of claim 2, wherein obtaining the identified messages further comprises:
   making a determination that a second log entry of the log entries does not comprise any instance of the message identifier; and
   based on the determination:
      identifying a pattern of the second log entry, and
      pattern matching the pattern to a second identified message of the identified messages.

5. The computer-implemented method of claim 2, wherein each of the identified messages further includes, in addition to and different from the message identifier, a severity identifier that indicates a severity level of the condition associated with the log entry of the logs corresponding to the respective ones of the identified messages.

6. The computer-implemented method of claim 1, further comprising:
   predicting, with the inference model and based on the identified messages and the temporal relationships between the identified messages, an occurrence time for the future impairment.

7. The computer-implemented method of claim 1, further comprising:
   predicting, with the inference model and based on the identified messages and the temporal relationships between the identified messages, a second future impairment of the deployment;
   obtaining a confidence level for the future impairment and a confidence level for the second future impairment; and
   discarding, based on the confidence level for the second future impairment, the second future impairment prior to executing the action set.

8. The computer-implemented method of claim 1, wherein the inference model is based, at least in part, on a time relationship between:
   a previous occurrence of an identified message pattern; and
   a previous occurrence of an impairment of a monitored deployment.

9. The computer-implemented method of claim 8, wherein the identified message pattern comprises a series of a first number of log events in a predetermined order.

10. The computer-implemented method of claim 9, wherein the inference model is further based, at least in part, on a second time relationship between:
    a previous occurrence of a second identified message pattern; and
    the previous occurrence of the impairment of the monitored deployment.

11. The computer-implemented method of claim 10, wherein the second identified message pattern comprises a second series of a second number of the log events in the predetermined order, the second number being different from the first number.

12. The computer-implemented method of claim 10, wherein the second identified message pattern comprises a second series of the first number of the log events in the predetermined order, the second series of the first number of the log events comprising a portion of the log events of the first series of the first number of log events and at least one other log event of the log events.

13. The computer-implemented method of claim 12, wherein the at least one other log event, in the predetermined order, immediately precedes or follows the log events of the first series of the first number of the log events in the predetermined order.

14. The computer-implemented method of claim 8, wherein the identified message pattern is one of a plurality of message patterns, each of the message patterns being based on a corresponding window size and a corresponding increment size for selecting a portion of log events of the logs for respective ones of the plurality of message patterns.

15. A non-transitory machine-readable medium having instructions stored therein, which when executed by a processor, cause the processor to perform operations for managing operation of a deployment by proactively identifying when the deployment is likely to enter an impairment state, the operations comprising:
    obtaining logs for a deployment, the logs reflecting activity of the deployment that may be relevant to the impairment state;
    obtaining identified messages within the logs, wherein each identified message of the identified messages indicates:
       an entity of the deployment that generated a log entry of the logs corresponding to respective ones of the identified messages, and
       a condition associated with the log entry of the logs corresponding to the respective ones of the identified messages,
       wherein each of the identified messages includes a message identifier that marks each of the identified messages as one of the identified messages and the message identifier is stored with first message contents of each of the identified messages;
    predicting, with an inference model, a future impairment of the deployment based on:
       the identified messages;
       temporal relationships between the identified messages; and
    executing an action set based, at least in part, on the future impairment predicted by the inference model to reduce a potential impact of the future impairment on the deployment, wherein the action set is executed as a separate process from the predicting performed by the inference model.

16. The non-transitory machine-readable medium of claim 15, wherein obtaining the identified messages comprises:
    for a first log entry of the log entries, reading the message identifier in the first log entry to identify the identified messages from the first log entry.

17. The non-transitory machine-readable medium of claim 16, wherein obtaining the identified messages further comprises:
    making a determination that a second log entry of the log entries does not comprise any instance of the message identifier; and
    based on the determination:
       reading second message contents from the second log entry, the second message contents being unstructured data, and
       translating the unstructured data to a second identified message of the identified messages.

18. A deployment manager, comprising:
    a processor; and
    a memory coupled to the processor to store instructions, which when executed by the processor, cause the processor to perform operations for managing operation of a deployment by proactively identifying when the deployment is likely to enter an impairment state, the operations comprising:
       obtaining logs for a deployment, the logs reflecting activity of the deployment that may be relevant to the impairment state;
       obtaining identified messages within the logs, wherein each identified message of the identified messages indicates:
          an entity of the deployment that generated a log entry of the logs corresponding to respective ones of the identified messages, and
          a condition associated with the log entry of the logs corresponding to the respective ones of the identified messages, and
          wherein each of the identified messages includes a message identifier that marks each of the identified messages as one of the identified messages and the message identifier is stored with first message contents of each of the identified messages;
       predicting, with an inference model, a future impairment of the deployment based on:
          the identified messages, and
          temporal relationships between the identified messages; and
       executing an action set based, at least in part, on the future impairment predicted by the inference model to reduce a potential impact of the future impairment on the deployment, wherein the action set is executed as a separate process from the predicting performed by the inference model.

19. The deployment manager of claim 18, wherein obtaining the identified messages comprises:
    for a first log entry of the log entries, reading the message identifier in the first log entry to identify the identified messages from the first log entry.

20. The deployment manager of claim 19, wherein obtaining the identified messages further comprises:
    making a determination that a second log entry of the log entries does not comprise any instance of the message identifier; and
    based on the determination:

reading second message contents from the second log entry, the second message contents being unstructured data, and translating the unstructured data to a second identified message of the identified messages.

\* \* \* \* \*